US012749678B2

(12) United States Patent
Kwak et al.

(10) Patent No.: US 12,749,678 B2

(45) Date of Patent: Sep. 29, 2026

(54) SOLID PHASE SYNTHESIS METHOD OF POSITIVE ELECTRODE ACTIVE MATERIAL OF NICKEL-RICH LITHIUM COMPOSITE TRANSITION METAL OXIDE IN A FORM OF A SINGLE PARTICLE, POSITIVE ELECTRODE ACTIVE MATERIAL OF NICKEL-RICH LITHIUM COMPOSITE TRANSITION METAL OXIDE IN A FORM OF A SINGLE PARTICLE FORMED THEREFROM, POSITIVE ELECTRODE AND LITHIUM SECONDARY BATTERY CONTAINING THE SAME

(71) Applicant: LG Chem, Ltd., Seoul (KR)

(72) Inventors: Ho-Young Kwak, Daejeon (KR); Dae-Sung Kim, Daejeon (KR); Jun-Gyu Kim, Daejeon (KR); Jae-Young Moon, Daejeon (KR); Myoung-Hwan Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 736 days.

(21) Appl. No.: 18/019,921

(22) PCT Filed: Sep. 24, 2021

(86) PCT No.: PCT/KR2021/013073

§ 371 (c)(1),
(2) Date: Feb. 6, 2023

(87) PCT Pub. No.: WO2022/065935

PCT Pub. Date: Mar. 31, 2022

(65) Prior Publication Data

US 2023/0290942 A1 Sep. 14, 2023

(30) Foreign Application Priority Data

Sep. 24, 2020 (KR) ........................ 10-2020-0124155

(51) Int. Cl.
*H01M 4/505* (2010.01)
*C01G 53/50* (2025.01)
(Continued)

(52) U.S. Cl.
CPC ............ *H01M 4/505* (2013.01); *C01G 53/50* (2013.01); *H01M 4/131* (2013.01); *H01M 4/525* (2013.01);
(Continued)

(58) Field of Classification Search
CPC ...................................................... H01M 4/505
See application file for complete search history.

(56) References Cited

U.S. PATENT DOCUMENTS

2002/0110518 A1* 8/2002 Okuda .................. C01G 53/42 429/231.1
2012/0248388 A1 10/2012 Nagai et al.
(Continued)

FOREIGN PATENT DOCUMENTS

CN 101916843 A 12/2010
CN 104157870 A 11/2014
(Continued)

OTHER PUBLICATIONS

International Search Report for PCT/KR2021/013073 mailed Dec. 30, 2021. 3 pgs.
(Continued)

*Primary Examiner* — William D Young

(74) *Attorney, Agent, or Firm* — Lerner David LLP

(57) ABSTRACT

A positive electrode active material and a method of making the same are disclosed herein. In some embodiments, a method includes mixing transition metal raw powders including a nickel raw powder to prepare a first mixture, where the first mixture has a molar ratio of lithium to total transition metals of 0.95 to 1.02, and where a molar ratio of
(Continued)

nickel to total transition metals is 80 mol % or more, sintering the first mixture in an oxygen-containing atmosphere, and cooling the sintered first mixture to obtain a first sintered product, mixing the first sintered product with a second lithium raw material to prepare a second mixture, where the second mixture has molar ratio of lithium to total transition metals of 1.00 to 1.09, and sintering the second mixture in the oxygen-containing atmosphere to prepare a lithium composite transition metal oxide in the form of a single particle.

8 Claims, 5 Drawing Sheets

(51) Int. Cl.

*H01M 4/02* (2006.01)
*H01M 4/131* (2010.01)
*H01M 4/525* (2010.01)
*H01M 10/052* (2010.01)

(52) U.S. Cl.

CPC ....... *H01M 10/052* (2013.01); *C01P 2002/50* (2013.01); *C01P 2004/03* (2013.01); *C01P 2004/61* (2013.01); *C01P 2006/40* (2013.01); *H01M 2004/028* (2013.01)

(56) References Cited

U.S. PATENT DOCUMENTS

| | | | | |
|---|---|---|---|---|
| 2014/0057163 | A1 | 2/2014 | Bae et al. | |
| 2014/0134491 | A1 | 5/2014 | Sugimoto et al. | |
| 2015/0010819 | A1 | 1/2015 | Lee et al. | |
| 2018/0145322 | A1 | 5/2018 | Choi et al. | |
| 2018/0159128 | A1 | 6/2018 | Kim et al. | |
| 2018/0248179 | A1 * | 8/2018 | Wang | C01G 53/50 |
| 2019/0074511 | A1 | 3/2019 | Blangero et al. | |
| 2019/0157673 | A1 | 5/2019 | Kobayashi | |
| 2020/0106098 | A1 | 4/2020 | Kobayashi | |
| 2021/0005874 | A1 | 1/2021 | Park et al. | |
| 2021/0028445 | A1 | 1/2021 | Jung et al. | |
| 2021/0036317 | A1 | 2/2021 | Choi et al. | |
| 2021/0135187 | A1 | 5/2021 | Park et al. | |

FOREIGN PATENT DOCUMENTS

| | | | |
|---|---|---|---|
| CN | 106910882 | A | 6/2017 |
| CN | 107403930 | A | 11/2017 |
| CN | 109279659 | A | 1/2019 |
| CN | 110931768 | A | 3/2020 |
| JP | 2002-175808 | A | 6/2002 |
| JP | 2002-187722 | A | 7/2002 |
| JP | WO2012176471 | A1 | 2/2015 |
| JP | 2018-125305 | A | 8/2018 |
| JP | 2018533166 | A | 11/2018 |
| JP | 6516919 | B2 | 5/2019 |
| KR | 2011-0079025 | A | 7/2011 |
| KR | 2012-0085942 | A | 8/2012 |
| KR | 2014-0025821 | A | 3/2014 |
| KR | 2015-0006283 | A | 1/2015 |
| KR | 2015-0080376 | A | 7/2015 |
| KR | 2018-0038485 | A | 4/2018 |
| KR | 2018-0056310 | A | 5/2018 |
| KR | 2018-0063849 | A | 6/2018 |
| KR | 2019-0007801 | A | 1/2019 |
| KR | 2019-0116063 | A | 10/2019 |
| KR | 2019-0119442 | A | 10/2019 |
| KR | 2019-0125405 | A | 11/2019 |
| KR | 2019-0129615 | A | 11/2019 |
| KR | 2020-0106043 | A | 9/2020 |
| WO | WO2016-148096 | A1 | 10/2017 |
| WO | 2018158078 | A1 | 9/2018 |
| WO | 2019120973 | A1 | 6/2019 |
| WO | 2019221497 | A1 | 11/2019 |
| WO | 2020-082019 | A1 | 4/2020 |

OTHER PUBLICATIONS

Search Report dated Jun. 19, 2023 from Office Action for Chinese Application No. 202180032572.6 issued Jun. 20, 2023. 3 pgs.

Lee Seung-Hwan et al: "Optimized electrochemical performance of Ni rich LiNi0.91Co0.06Mn0.0302 cathodes for high-energy lithium ion batteries", Scientific Reports, vol. 9, No. 1, Jun. 20, 2019 (Jun. 20, 2019), pp. 1-7, XP093112356, US ISSN: 2045-2322, DOI: 10.1038/s41598-019-45531-2 Retrieved from the Internet: URL:https://www.nature.com/articles/s41598-019-45531-2>.

Park Hye-Jin et al: "Influence of sintering temperatures on microstructure and electrochemical performances of LiNi0.93Co0.04A10.0302 cathode for high energy lithium ion batteries", Scientific Reports, vol. 12, No. 1, Jun. 10, 2022 (Jun. 10, 2022), pp. 9617-9625, XP093112352, US ISSN: 2045-2322, DOI: 10.1038/s41598-022-13843-5 Retrieved from the Internet: URL:https://www.nature.com/articles/s41598-022-13843-5>.

Extended European Search Report for Application No. 21872963.0 dated Jan. 26, 2024. 7 pgs.

* cited by examiner

SOLID PHASE SYNTHESIS METHOD OF POSITIVE ELECTRODE ACTIVE MATERIAL OF NICKEL-RICH LITHIUM COMPOSITE TRANSITION METAL OXIDE IN A FORM OF A SINGLE PARTICLE, POSITIVE ELECTRODE ACTIVE MATERIAL OF NICKEL-RICH LITHIUM COMPOSITE TRANSITION METAL OXIDE IN A FORM OF A SINGLE PARTICLE FORMED THEREFROM, POSITIVE ELECTRODE AND LITHIUM SECONDARY BATTERY CONTAINING THE SAME

CROSS-REFERENCE TO RELATED APPLICATIONS

The present application is a national phase entry under 35 U.S.C. § 371 of International Application No. PCT/KR2021/013073, filed on Sep. 24, 2021, which claims the benefit of Korean Patent Application No. 10-2020-0124155 filed on Sep. 24, 2020, the disclosures of which are incorporated by reference herein.

TECHNICAL FIELD

The present disclosure relates to a solid phase synthesis method of a positive electrode active material of nickel-rich lithium composite transition metal oxide in a form of a single particle, a positive electrode active material of nickel-rich lithium composite transition metal oxide in a form of a single particle formed therefrom and a positive electrode and a lithium secondary battery comprising the same.

BACKGROUND ART

Attention is directed to a positive electrode active material of Ni-rich lithium composite transition metal oxide with high energy density, but with increasing nickel content, batteries' life stability sharply reduces. One of the causes of shortened lifespan is related with the structure the positive electrode active material of Ni-rich lithium composite transition metal oxide.

The commonly used positive electrode active material of Ni-rich lithium composite transition metal oxide in the form of secondary particles formed by agglomeration of primary particles suffers cracks at the interface between the primary particles with increasing charge/discharge cycles, resulting in a short lifespan of batteries.

Accordingly, there is a development of a positive electrode active material of Ni-rich lithium composite transition metal oxide in the form of a single particle, not a secondary particle. The positive electrode active material in the form of a single particle having no grain boundary may significantly reduce the creation of micro/macro-cracks, thereby increasing the structural stability of the positive electrode active material of Ni-rich lithium composite transition metal oxide.

In the manufacture of the positive electrode active material of Ni-rich lithium composite transition metal oxide in the form of a single particle, there is an increase in residual lithium impurities, for example, lithium carbonate, and when reacting with an electrolyte solution, the impurities degrade the battery performance, produce gas and cause gelation in the preparation of an electrode slurry.

To reduce the amount of lithium impurities, the Ni-rich lithium positive electrode active material in the form of a single particle undergoes a process of washing with water after it is manufactured. However, after the washing process is performed, the surface of the positive electrode material becomes chemically unstable, causing a variety of electrochemical side reactions. Additionally, when the positive electrode active material of Ni-rich lithium composite transition metal oxide is in the form of a single particle, the amount of lithium impurities removed during washing is small.

Meanwhile, the positive electrode active material of Ni-rich lithium composite transition metal oxide is manufactured by preparing a mixed transition metal hydroxide such as nickel manganese cobalt hydroxide using a coprecipitation method, mixing it with a lithium raw material and sintering. However, the method for manufacturing the positive electrode active material using the coprecipitation method is complicated.

DISCLOSURE

Technical Problem

Accordingly, the present disclosure is directed to providing a solid phase synthesis method of a positive electrode active material of Ni-rich lithium composite transition metal oxide in the form of a single particle with low lithium impurity content without needing to perform a washing process.

The present disclosure is further directed to providing a solid phase synthesis method of a positive electrode active material of Ni-rich lithium composite transition metal oxide in the form of a single particle in a relatively economical and easy manner.

The present disclosure is further directed to providing a positive electrode active material of Ni-rich lithium composite transition metal oxide in the form of a single particle having the above-described features.

The present disclosure is further directed to providing a positive electrode and a lithium secondary battery comprising the positive electrode active material of Ni-rich lithium composite transition metal oxide in the form of a single particle having the above-described features.

Technical Solution

To solve the above-described technical problem, a solid phase synthesis method of a positive electrode active material of nickel-rich lithium composite transition metal oxide in a form of a single particle according to a first embodiment of the present disclosure comprises, (S1) mixing transition metal raw powders to prepare a first mixture, wherein the first mixture has a molar ratio of lithium to total transition metals of 0.95 to 1.02, and wherein the transition metal powders comprise a nickel raw powder, wherein a molar ratio of nickel to total transition metals is 80 mol % or more;

(S2) primary sintering the first mixture in an oxygen-containing atmosphere to cause solid phase reaction, and cooling the sintered first mixture to obtain a first sintered product;

(S3) mixing the first sintered product with a second lithium raw material to prepare a second mixture, wherein the second mixture has a molar ratio of lithium to total transition metal of 1.00 to 1.09; and (S4) secondary sintering the second mixture in the oxygen-containing atmosphere to prepare a lithium composite transition metal oxide in the form of a single particle.

According to a second embodiment of the present disclosure, in the solid phase synthesis method according to the first embodiment, a molar ratio of lithium of the second lithium raw material to total transition metals is 0.01 to 0.07.

According to a third embodiment of the present disclosure, in at least one of the first or second embodiment, transition metal raw powders comprising the nickel raw powder and may further comprise a cobalt raw powder and a manganese raw powder.

In this instance, the nickel raw powder may comprise at least one selected from the group consisting of nickel oxide, nickel carbonate, nickel sulfate, nickel hydroxide, nickel phosphate and nickel nitrate, the cobalt raw powder may comprise at least one selected from the group consisting of cobalt oxide, cobalt carbonate, cobalt sulfate, cobalt hydroxide and cobalt phosphate, and the manganese raw powder may comprise at least one selected from the group consisting of manganese dioxide, manganese carbonate, manganese sulfate and manganese nitrate. In addition, the molar ratios of cobalt and manganese, respectively, to total transition metals are 10 mol % or less but is not limited thereto.

According to a fourth embodiment of the present disclosure, in at least one of the first to third embodiments, the first lithium raw material and the second lithium raw material may comprise, independently of each other, at least one selected from the group consisting of lithium hydroxide, lithium hydroxide hydrate and lithium carbonate.

According to a fifth embodiment of the present disclosure, in at least one of the first to fourth embodiments, a temperature of the primary sintering in the (S2) may be 760° C. to 900° C., and a temperature of the secondary sintering in the (S4) may be 760° C. to 900° C.

According to a sixth embodiment of the present disclosure, in at least one of the first to fifth embodiments, the solid phase synthesis method of a positive electrode active material of nickel-rich lithium composite transition metal oxide in a form of a single particle may be performed by a non-washing process (i.e., does not include a washing process), and a lithium impurity content in the lithium composite transition metal oxide may be 1 weight % or less.

According to a seventh embodiment of the present disclosure, in at least one of the first to sixth embodiments, the positive electrode active material of nickel-rich lithium composite transition metal oxide in a form of a single particle may have an average particle size (D50) of 3.0 to 8.0 μm.

A positive electrode active material of nickel-rich lithium composite transition metal oxide in a form of a single particle manufactured by the solid phase synthesis method of the embodiments described above may be included as positive electrode active material of a positive electrode, and the positive electrode may be advantageously used in a lithium secondary battery.

Advantageous Effects

According to the solid phase synthesis method of the present disclosure, it is possible to manufacture a positive electrode active material of Ni-rich lithium composite transition metal oxide in the form of a single particle with low lithium impurity content without needing to perform a washing process in a relatively straightforward manner.

Additionally, the positive electrode active material of Ni-rich lithium composite transition metal oxide in the form of a single particle according to the above-described manufacturing method may reduce gelation in the preparation of a positive electrode slurry and gas generation in batteries, and improve, especially, the initial capacity of lithium secondary batteries comprising the same.

BEST MODE

Figure 1:
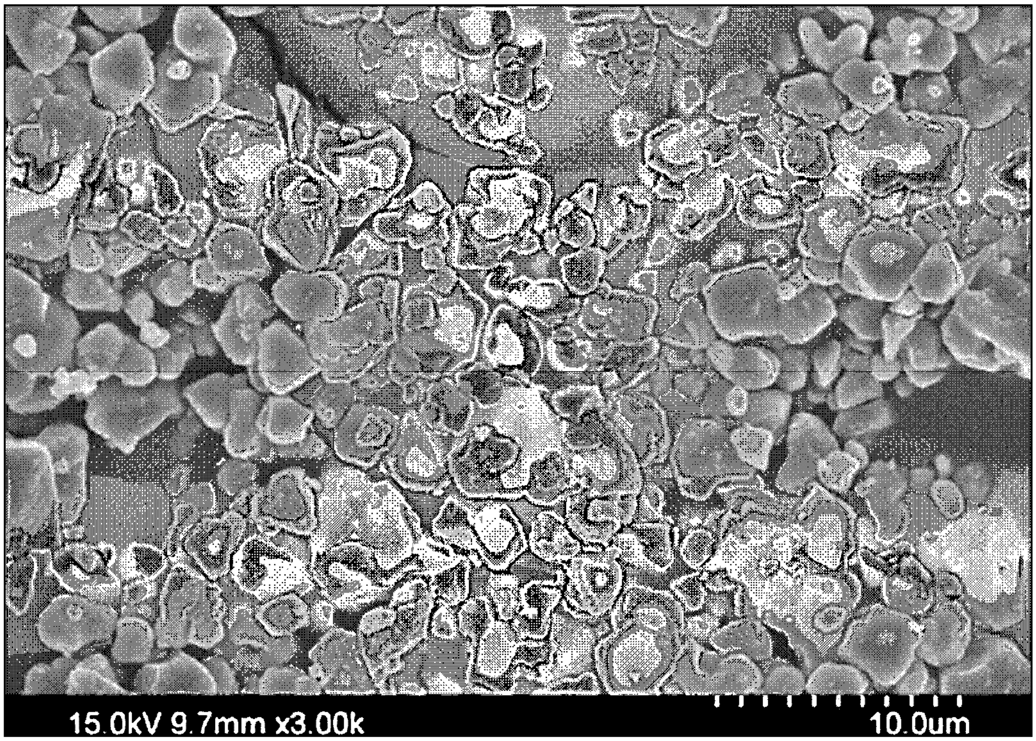
FIG. 1 is a scanning electron microscopy (SEM) image of a positive electrode active material particle according to example 1.

Hereinafter, the present disclosure will be described in detail. It should be understood that the terms or words used in the specification and the appended claims should not be construed as limited to general and dictionary meanings, but rather interpreted based on the meanings and concepts corresponding to technical aspects of the present disclosure on the basis of the principle that the inventor is allowed to define terms appropriately for the best explanation.

Hereinafter, a solid phase synthesis method of a positive electrode active material of Ni-rich lithium composite transition metal oxide in the form of a single particle according to the present disclosure will be described.

According to the solid phase synthesis method of a positive electrode active material of Ni-rich lithium composite transition metal oxide in the form of a single particle according to a first embodiment of the present disclosure, first, each transition metal raw powder comprising a nickel raw powder in such an amount that the mole ratio of nickel to the total transition metal of 80 mol % or more is mixed with a first lithium raw material such that the mole ratio of lithium to the total transition metal is 0.95 to 1.02 to prepare a first mixture (S1).

The first lithium raw material may include, without limitation, a variety of lithium raw materials well known in the corresponding technical field, and may include, for example, a lithium containing carbonate (for example, a lithium carbonate), a lithium containing hydroxide (for example, lithium hydroxide hydrate ($LiOH \cdot H_2O$)), a lithium containing hydroxide (for example, lithium hydroxide), lithium containing nitrate (for example, lithium nitrate ($LiNO_3$)) and a lithium containing chloride (for example, lithium chloride (LiCl)). Preferably, the first lithium raw material may include at least one selected from the group consisting of lithium hydroxide, lithium hydroxide hydrate and lithium carbonate.

Each transition metal raw powder comprising the nickel raw powder in such an amount that the mole ratio of nickel to the total transition metal of 80 mol % or more is mixed with the first lithium raw material. That is, in the mixture of the nickel raw powder and each transition metal raw powder, the amount of the nickel raw powder is adjusted such that the mole ratio of nickel to the total transition metal is 80 mol % or more.

The nickel raw powder refers to a raw material powder comprising only nickel to provide nickel as a transition metal, and each transition metal raw powder refers to each raw material powder comprising only one type of transition metal, and for example, in the case of including cobalt and manganese as the transition metal, refers to a raw material powder comprising only cobalt as the transition metal and a raw powder comprising only manganese as the transition metal.

Each transition metal raw powder comprising the nickel raw powder may comprise a nickel raw powder, a cobalt raw powder and a manganese raw powder.

The nickel raw powder may include at least one selected from the group consisting of nickel oxide, nickel carbonate, nickel sulfate, nickel hydroxide, nickel phosphate and nickel nitrate, the cobalt raw powder may include at least one selected from the group consisting of cobalt oxide, cobalt carbonate, cobalt sulfate, cobalt hydroxide and cobalt phosphate, and the manganese raw powder may include at least one selected from the group consisting of manganese dioxide, manganese carbonate, manganese sulfate and manganese nitrate. Additionally, the cobalt raw powder and the manganese raw powder may be mixed, independently of each other, in such an amount of that the mole ratio of cobalt and manganese to the total transition metal is 10 mol % or less, respectively.

The mix ratio of each transition metal raw powder comprising the first lithium raw material and the nickel raw powder in the first mixture is mixed such that the mole ratio of lithium to the total transition metal is 0.95 to 1.02. When the mix mole ratio is less than 0.95, there is a problem with the formation of composite transition metal phase by solid phase synthesis, and when the mix mole ratio exceeds 1.02, residual lithium increases and the performance of the positive electrode active material degrades.

Meanwhile, in addition to the lithium raw material and the transition metal raw powder, the first mixture of (S1) may further comprise a doping raw material to improve the stability and properties of the positive electrode active material. The doping raw material may include oxide, hydroxide, sulfide, oxyhydroxide, halide or its mixture comprising at least one element selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B and Mo.

Subsequently, the first mixture undergoes primary sintering in an oxygen environment to cause a solid phase reaction, followed by cooling (S2).

The primary sintering is performed in the oxygen environment. Here, the oxygen environment refers to an environment (for example, atmospheric environment) in which all gases are, in substance, oxygen, or an environment containing a sufficient amount of oxygen for the primary sintering. However, the primary sintering is preferably performed in a condition that the partial pressure of oxygen is higher than the atmospheric environment.

In the primary sintering, the temperature may be 760° C. to 900° C., and more preferably 780° C. to 870° C.

When the primary sintering is performed, the solid phase reaction between the lithium raw material and each transition metal raw powder forms a primary sintered mixture of seeds of lithium composite transition metal oxide having a spinel structure and lithium composite transition metal oxide having a layered structure. After the primary sintering, it usually stays still for natural cooling, but is not limited thereto.

Subsequently, the result of the (S2) is further mixed with a second lithium raw material such that the total mole ratio of lithium to the total transition metal (the total mole ratio of the first lithium raw material and the second lithium raw material) is 1.00 to 1.09 to prepare a second mixture (S3).

As described above, the inventors discovered that lithium impurities are significantly reduced by mixing the first lithium raw material with the transition metal raw powders at the predetermined mole ratio according to (S1), performing the primary sintering, further mixing with the second lithium raw material at the predetermined mole ratio, and performing the secondary sintering.

Here, the result of the (S2) may be ground or sieved, if necessary, and put into the secondary sintering step. Additionally, the second lithium raw material may include the above-described first lithium raw materials.

As the second lithium raw material, the above-described first lithium raw materials may be independently used. When the second lithium raw material is mixed such that the total mole ratio of lithium to transition metal is less than 1.00, there is a problem with the formation of composite transition metal phase, and when the second lithium raw material is mixed such that the total mole ratio of lithium to transition metal exceeds 1.09, residual lithium increases. In particle, the second lithium raw material may be mixed in such an amount that the mole ratio of lithium of the second lithium raw material to the total transition metal is 0.01 to 0.07.

Subsequently, the second mixture undergoes secondary sintering in an oxygen environment (S3).

In the secondary sintering, the temperature may be 760° C. to 900° C., and more preferably 780° C. to 870° C.

With the above-described secondary sintering, it is possible to manufacture the positive electrode active material of Ni-rich lithium composite transition metal oxide in the form of a single particle with low lithium impurity content of, for example, 1 weight % or less, without needing to perform a washing process. The "single particle" is at least 80% of single-crystalline or polycrystalline single particles having no grain boundary, not a secondary particle formed by agglomeration of primary particles.

The average particle size D50 of the single particle may be 3.0 to 8 μm, but is not limited thereto. The average particle size D50 is defined as a particle size at 50% of the particle size distribution, and refers to a D50 value of a particle measured by laser diffraction.

The single particles of the positive electrode active material of Ni-rich lithium composite transition metal oxide manufactured as described above may be coated on a positive electrode current collector, and may be used in a positive electrode by the below-described method.

For example, the positive electrode current collector is not limited to a particular type and may include any type of material having conductive properties without causing any chemical change to the battery, and for example, stainless steel, aluminum, nickel, titanium, sintered carbon or aluminum or stainless steel surface treated with carbon, nickel, titanium or silver. Additionally, the positive electrode current collector may be generally 3 to 500 μm in thickness, and may have microtexture on the surface to improve the adhesion strength of the positive electrode active material. For example, the positive electrode current collector may come in various forms, for example, films, sheets, foils, nets, porous bodies, foams and non-woven fabrics.

In addition to the positive electrode active material, the positive electrode active material layer may comprise a conductive material and optionally a binder if necessary. In this instance, the positive electrode active material may be included in an amount of 80 to 99 weight %, and more specifically 85 to 98.5 weight % based on the total weight of the positive electrode active material layer. When the amount of the positive electrode active material is within the above-described range, the outstanding capacity characteristics may be manifested.

The conductive material is used to impart conductivity to the electrode, and may include, without limitation, any type of conductive material having electron conductivity without causing any chemical change in the battery. A specific example of the conductive material may include graphite, for example, natural graphite or artificial graphite; carbon-based materials, for example, carbon black, acetylene black, ketjen black, channel black, furnace black, lamp black, thermal black and carbon fibers; metal powder or metal fibers, for example, copper, nickel, aluminum and silver; conductive whiskers, for example, zinc oxide and potassium titanate; conductive metal oxide, for example, titanium oxide; or conductive polymers, for example, polyphenylene derivatives, used alone or in combination. The conductive material may be included in an amount of 0.1 to 15 weight % based on the total weight of the positive electrode active material layer.

The binder plays a role in improving the bonding between the positive electrode active material particles and the adhesive strength between the positive electrode active material and the current collector. A specific example of the binder may include polyvinylidene fluoride (PVDF), polyvinylidene fluoride-hexafluoropropylene copolymer (PVDF-co-HFP), polyvinylalcohol, polyacrylonitrile, carboxymethylcellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluoro rubber, or a variety of copolymers thereof, used alone or in combination. The binder may be included in an amount of 0.1 to 15 weight % based on the total weight of the positive electrode active material layer.

The positive electrode may be manufactured by the commonly used positive electrode manufacturing method except that the above-described positive electrode active material is used. Specifically, the positive electrode may be manufactured by coating a positive electrode active material layer forming composition prepared by dissolving or dispersing the positive electrode active material and optionally, the binder and the conductive material in a solvent on the positive electrode current collector, following by drying and press rolling.

According to another method, the positive electrode may be manufactured by casting the positive electrode active material layer forming composition on a support, separating a film from the support and laminating the film on the positive electrode current collector.

The positive electrode manufactured by the above-described method may be used in lithium secondary batteries.

Hereinafter, the present disclosure will be described in detail through examples. However, the embodiments according to the present disclosure may be modified in a variety of other forms, and it should not be interpreted that the scope of the present disclosure is limited to the following examples. The examples of the present disclosure are provided for complete and thorough explanation of the present disclosure to those having ordinary skill in the art.

Example 1

A positive electrode active material represented as $Li[Ni_{0.92}Co_{0.04}Mn_{0.04}]O_2$ in the form of a single particle is manufactured as below.

As the nickel-manganese-cobalt precursor, $Ni(OH)_2$, $Co_3O_4$ and $MnO_2$ are mixed with the above-described target composite, and then mixed with lithium hydroxide hydrate ($LiOH\ H_2O$) as the first lithium raw material such that the mole ratio of lithium to transition metal is 1.00 to prepare a first mixture.

The first mixture is put into a stainless steel furnace, and after increasing the temperature to 810° C. while introducing oxygen at the rate of 3 L/min, primary sintering is performed while maintaining the temperature for 10 hours, followed by cooling and grinding to break necking between particles.

Subsequently, the obtained result is further mixed with a second lithium raw material (lithium hydroxide hydrate) such that the total mole ratio of lithium to the total transition metal is 1.05 to prepare a second mixture.

Subsequently, after increasing the temperature to 810° C. while introducing oxygen at the rate of 3 L/min, secondary sintering is performed while maintaining the temperature for 5 hours, followed by cooling to obtain a positive electrode active material of target formula in the form of a single particle.

Example 2

The same process as example 1 is performed except that the amounts of the first lithium raw material and the second lithium raw material are adjusted such that the mole ratio of lithium to the total transition metal is as described in Table 1.

Comparative Examples 1 to 3

The same process as example 1 is performed except that the amounts of the first lithium raw material and the second lithium raw material are adjusted such that the mole ratio of lithium to the total transition metal is as described in Table 1.

Figure 2:
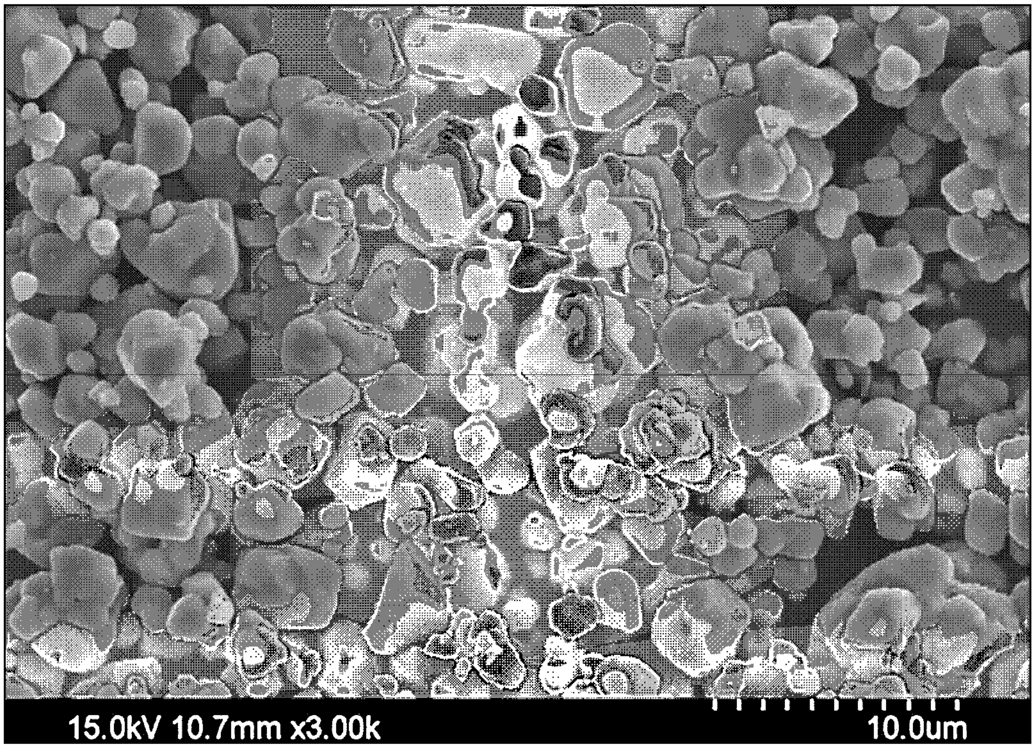
FIG. 2 is an SEM image of a positive electrode active material particle according to example 2.
Figure 3:
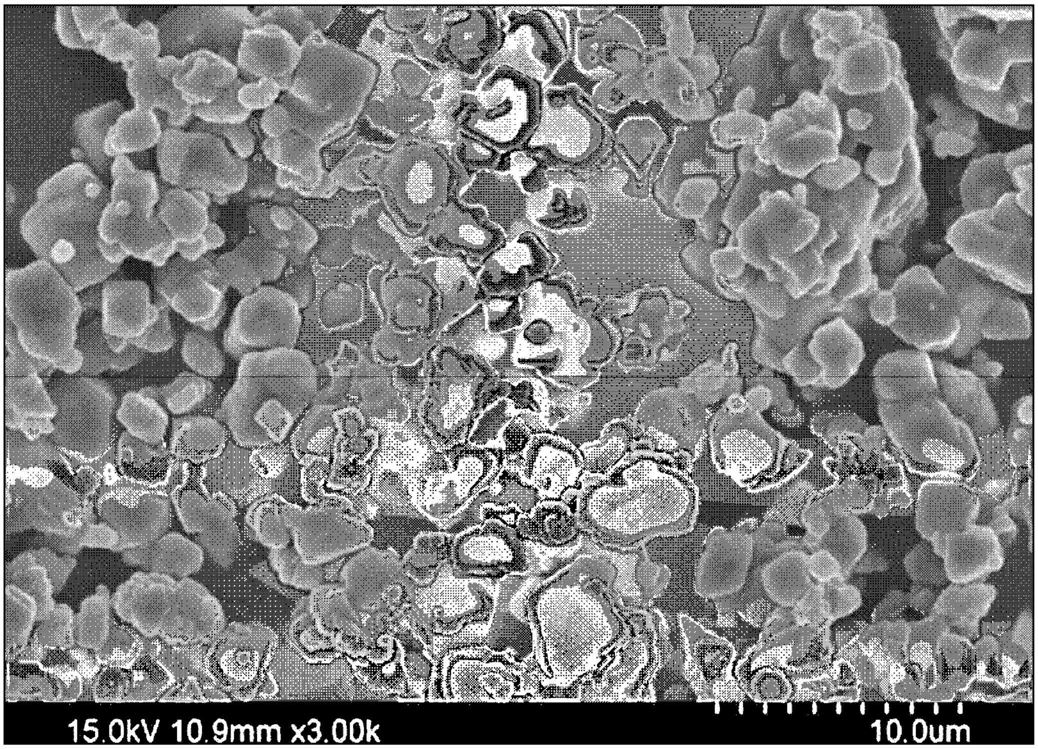
FIG. 3 is an SEM image of a positive electrode active material particle according to comparative example 1.
Figure 4:
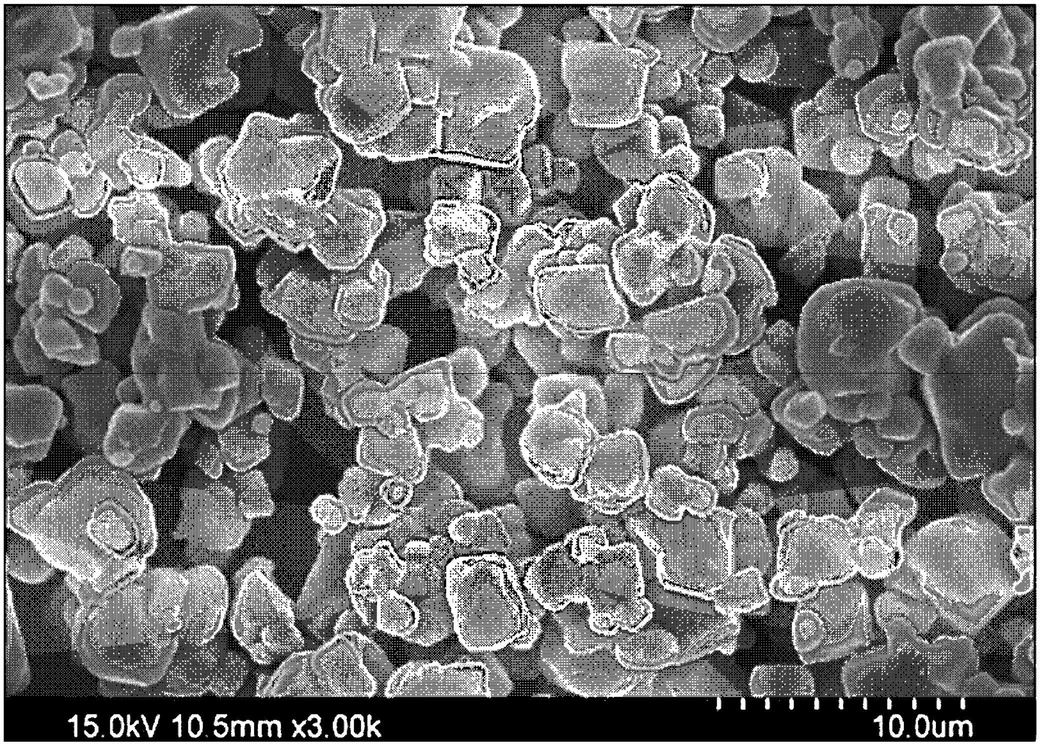
FIG. 4 is an SEM image of a positive electrode active material particle according to comparative example 2.
Figure 5:
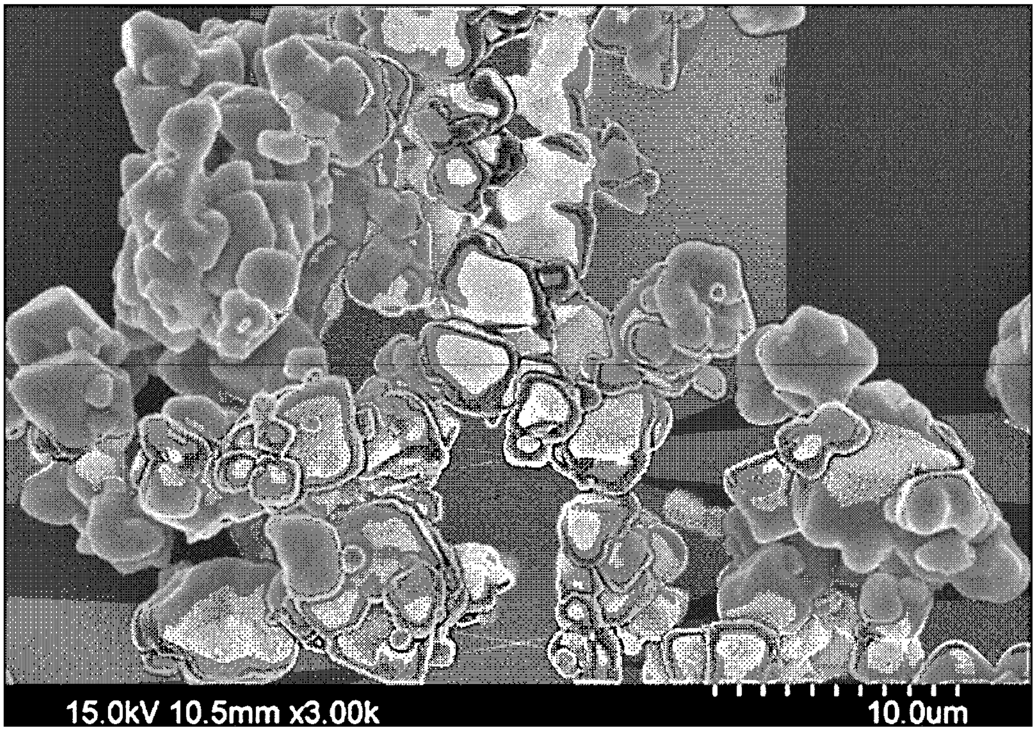
FIG. 5 is an SEM image of a positive electrode active material particle according to comparative example 3.

FIGS. 1 to 5 each show SEM images of the positive electrode active material particles manufactured according to the above-described examples and comparative examples.

<Lithium Impurity Content Measurement>

The amount of lithium impurities remaining on the surface of the obtained positive electrode active material of each of example and comparative example is measured as below and the measurements are shown in Table 1.

To measure the amount of Li by-products on the surface of the obtained positive electrode active material, pH titration is performed. For the pH meter, Metrohm is used, and after titration per 1 mL, pH is recorded. Specifically, the amount of the lithium by-products on the surface of the positive electrode active material is measured by pH titration with 0.1N HCl using the Metrohm ph meter.

<Average Particle Size Measurement>

The D50 of the particles is measured using laser diffraction.

<Initial Capacity Measurement (mA/g) (Charge/Discharge)>

The positive electrode active material manufactured by examples and comparative examples, a polyvinylidene fluoride binder and carbon black are dispersed in NMP solution at a weight ratio of 97.5:1.5:1.0 to prepare a slurry, and the slurry is coated on an Al current collector. Subsequently, roll pressing is performed to manufacture a positive electrode.

Additionally, a coin half cell is manufactured using a lithium metal as a counter electrode.

After the first charge/discharge cycle of the manufactured coin half cell at room temperature in the conditions of end-of-charge voltage of 4.25V, end-of-discharge of 2.5V and 0.1 C/0.1 C, the initial capacity is measured.

TABLE 1

| Sample | Amount of lithium raw material to the total transition metal (calculated and indicated as Li mole ratio) First time | Second time | D50 (μm) | Lithium impurity content (weight %) Before washing | After washing | Initial capacity (mA/g) |
|---|---|---|---|---|---|---|
| Example 1 | 1.0 | 0.05 | 4.8 | 0.54 | (non-washing) | 197 |
| Example 2 | 0.95 | 0.05 | 5.4 | 0.43 | (non-washing) | 200 |
| Comparative example 1 | 1.00 | — | 5.2 | 0.32 | (non-washing) | 184 |
| Comparative example 2 | 1.05 | — | 7.9 | 1.33 | 0.69 | 191 (after washing) |
| Comparative example 3 | 1.00 | 0.10 | 9.7 | 2.67 | 0.83 | 186 (after washing) |

From the results of Table 1, the positive electrode active materials of Ni-rich lithium composite transition metal oxide of the examples exhibit low lithium impurity content and high initial capacity before washing. Meanwhile, comparative example 1 has low lithium impurity content but its initial capacity is low, and comparative examples 2 and 3 have high lithium impurity content, and accordingly, the batteries using the positive electrode active materials after washing have insufficient initial capacity.

What is claimed is:

1. A method of making a positive electrode active material by solid phase synthesis, comprising:

(S1) mixing transition metal raw powders with a first lithium raw material to prepare a first mixture, wherein the first mixture has a molar ratio of lithium to total transition metals of 0.95 to 1.02, and wherein the transition metal powders comprise a nickel raw powder, wherein a molar ratio of nickel to total transition metals is 80 mol % or more;

(S2) primary sintering the first mixture at a temperature of 760° C. to 900° C. in an oxygen-containing atmosphere to cause solid phase reaction, and cooling the sintered first mixture to obtain a first sintered product;

(S3) mixing the first sintered product with a second lithium raw material to prepare a second mixture, wherein the second mixture has a molar ratio of lithium to total transition metals of 1.00 to 1.09; and (S4) secondary sintering the second mixture at a temperature of 760° C. to 900° C. in the oxygen-containing atmosphere to prepare a lithium composite transition metal oxide in the form of a single particle.

2. The method according to claim 1, wherein a molar ratio of lithium from the second lithium raw material to total transition metals is 0.01 to 0.07.

3. The method according to claim 1, wherein the transition metal raw powders further comprise a cobalt raw powder and a manganese raw powder.

4. The method according to claim 3, wherein the nickel raw powder comprises at least one selected from the group consisting of nickel oxide, nickel carbonate, nickel sulfate, nickel hydroxide, nickel phosphate and nickel nitrate, wherein the cobalt raw powder comprises at least one selected from the group consisting of cobalt oxide, cobalt carbonate, cobalt sulfate, cobalt hydroxide and cobalt phosphate, and wherein the manganese raw powder comprises at least one selected from the group consisting of manganese dioxide, manganese carbonate, manganese sulfate and manganese nitrate.

5. The method according to claim 3, wherein molar ratios of cobalt and manganese, respectively, to total transition metals are 10 mol % or less.

6. The method according to claim 1, wherein the first lithium raw material and the second lithium raw material, independently, comprise at least one selected from the group consisting of lithium hydroxide, lithium hydroxide hydrate and lithium carbonate.

7. The method according to claim 1, wherein the method of making the positive electrode active material by solid phase synthesis does not include a washing process, and wherein a lithium impurity content in the lithium composite transition metal oxide is 1 weight % or less.

8. The method according to claim 1, wherein the lithium composite transition metal oxide has an average particle size (D50) of 3.0 to 8.0 μm.

* * * * *